Patented July 6, 1943

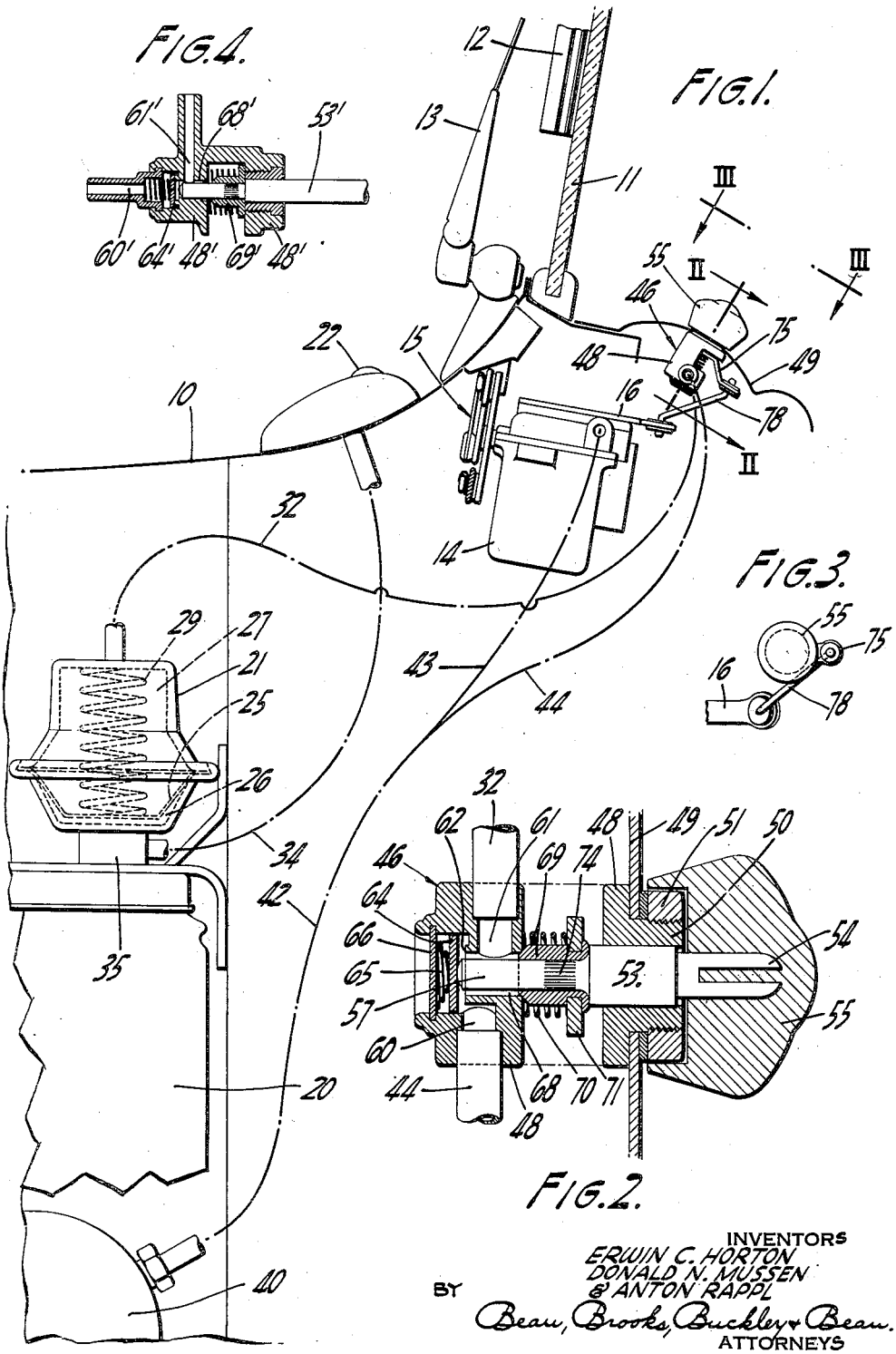

2,323,470

UNITED STATES PATENT OFFICE 2,323,470

WINDSHIELD CLEANER CONTROL

Erwin C. Horton, Hamburg, Donald N. Mussen, Williamsville, and Anton Rappl, Buffalo, N. Y., assignors to Trico Products Corporation, Buffalo, N. Y.

Application July 18, 1941, Serial No. 403,056

5 Claims. (Cl. 15—250.4)

This invention relates to windshield cleaning systems and particularly to improved control means for such systems as provide liquid dispensing means for cooperation in the cleaning action.

Apparatus has previously been proposed for spraying, squirting or otherwise depositing on the surface of a windshield a cleaning or de-icing liquid, preferably in the path of a windshield wiper arranged to traverse a portion of the surface of the windshield. The present invention is directed to improved means for controlling and directing the operation of apparatus of this class.

In a preferred form of the invention a manipulating element is provided for selectively either venting a fluid conduit to the atmosphere or connecting such conduit with a source of differential operating fluid pressure. In the latter condition the control means is arranged to provide operating pressure for ultimately causing ejection of cleaning or de-icing liquid from a suitable container or reservoir therefor.

The manipulating element may be arranged in such manner that a particular movement thereof effects control of an associated windshield wiper independently of the liquid emitting portion of the device and without affecting its condition of operation or rest. In the illustrated instance the manipulating element is arranged in such fashion that rotary movement thereof controls operation of a windshield wiper while movement thereof bodily in an axial direction controls operation of the liquid ejecting portion of the system. It is to be understood that movement of the manipulating element to control one of the devices may be effected regardless of the position of the manipulating device so far as its other controlling function is concerned. The two devices, the windshield wiper and the spraying means, are so intimately associated in their respective functions and cooperate, under many circumstances, to produce a single result, in such manner as to render their control by manipulation of a single control element of salient advantage. This is especially important when it is considered that the operation of the subject devices must be effected by the operator of a motor vehicle where a minimum of diversion of his attention from the main task of safely guiding the vehicle is a paramount consideration.

Many advantages resulting from an application of the principles of our invention will appear to those skilled in the art from a study of the following description of specific exemplary apparatus embodying the teachings of our invention. It is to be understood that the apparatus shown in the drawing and described below is by way of example only and our invention is not to be considered limited otherwise than as defined in the appended claims.

In the accompanying drawing:

Fig. 1 is a fragmentary, somewhat schematic cross sectional elevational view of the cowl portion of a motor vehicle with one form of the apparatus of our invention shown associated therewith;

Fig. 2 is a fragmentary cross sectional view taken on the line II—II of Fig. 1;

Fig. 3 is a fragmentary plan view taken as indicated by the line III—III of Fig. 1; and Fig. 4 is a view similar to Fig. 2 but showing a modified form of valve arrangement.

In the drawing like characters of reference denote like parts throughout the several figures and the numeral 10 designates the cowl portion of a motor vehicle having a windshield 11. The windshield is equipped with a conventional wiper as at 12 having an actuating arm 13 adapted to be oscillated from a conventional fluid pressure wiper operating motor 14 as by means of linkage indicated generally at 15. The fluid pressure motor has a control valve designated 16 and adapted to direct fluid in such manner as to render the wiper 12 operative or inoperative by movement of the valve 16 to the right and left, respectively, as viewed in Fig. 1.

According to the system involved in the present invention the vehicle is further equipped with means for spraying a cleaning or de-icing liquid, such as water or other liquid cleansing agent or an anti-freeze solution, on the surface of the windshield, preferably on the portion thereof adapted to be acted upon by the wiper 12. Such spraying means is shown generally in the co-pending application of Erwin C. Horton, one of the inventors herein, bearing Serial No. 265,616, filed April 1, 1939. For details of the spraying unit per se not found herein reference may be had to the foregoing application.

According to the spraying system disclosed in the co-pending application referred to, there are provided a spraying liquid reservoir 20, fluid actuated pumping means 21, and a spray directing jet 22, the latter being preferably fixed externally of the cowl 10 of the vehicle. The pumping means 21 may comprise a casing having a flexible diaphragm 25 for dividing the interior thereof into a wet chamber 26 and a dry chamber 27. In the form illustrated in the co-pending application referred to a coil spring 29 normally urges the diaphragm 25 to a position where the wet chamber 26 is of minimum volume.

A conduit leading from a source of sub-atmospheric pressure is indicated schematically at 32 in Fig. 1 and this conduit connects with the dry chamber 27. When sub-atmospheric pressure is thus applied to the dry chamber 27, the diaphragm 25 is lifted against the resilient resistance of the spring 29 and the wet chamber 26 expands, drawing in a charge of spraying liquid from the reservoir 20.

A spraying liquid conduit 34 extends from a fluid condut 35, connecting between the reservoir 20 and the pump 21 to the jet 22, for delivering spraying liquid to the latter. An upwardly opening check valve (not shown) is disposed in the conduit 35 below the conduit 34. For this reason, when the application of sub-atmospheric fluid pressure to the dry chamber 27 by way of the conduit 32 is discontinued, the spring 29 urges the diaphragm 25 downwardly to discharge spraying liquid therefrom. Due to the presence of the check valve referred to, the spraying liquid cannot re-enter the reservoir 20 and is consequently entirely discharged through the jet 22 by way of the conduit 34.

A check valve (not shown) is likewise disposed in the conduit 34 and permits fluid movement therein only toward the jet 22, whereby retrograde fluid flow in the conduit 34 during expanding movement of the wet chamber 26 is effectively prevented.

In Fig. 1 the numeral 40 designates a source of subatmospheric fluid pressure, in the present instance the intake manifold of the internal combustion propelling engine of the motor vehicle with which the present system is associated. Obviously a mechanical vacuum pump or the like may replace the intake manifold 40 as a source of partial vacuum and, if desired, a vacuum reservoir may be interposed between the source of subatmospheric pressure and the devices to be operated therefrom.

In Fig. 1 the numeral 42 designates a conduit leading from the partial vacuum source 40 and dividing into branches 43 and 44. The branch 43 leads to the fluid pressure motor 14 for the windshield wiper and the branch 44 leads to valve means designated generally 46, by means of which the conduit 44 may be selectively connected to and disconnected from the conduit 32 for rendering the pump 21 for the spraying liquid respectively active and inactive.

In the form illustrated in Figs. 1 and 2, the valve means 46 may comprise a supporting housing 48 which is shown, in Figs. 1 and 2, secured to a motor vehicle instrument panel 49 by means of a threaded extension 50 of the housing 48 and a securing nut 51. The housing 48 provides bearing for a valve operating element 53 which is disposed in said housing for rotative movement therein and also for axial sliding movement. The element 53 may be formed as at 54 for molding a knob 55 directly thereto although any suitable handle means secured to the operating element 53 will suffice. At its other end the element 53 may be provided with a reduced stem portion 57 for accomplishing valve control in a manner which will presently appear.

It will be noted from a consideration of Fig. 2 that the sub-atmospheric pressure conduits 44 and 32 are in communication with passages 60 and 61, respectively, in the valve housing 48 and that those passages merge in a valve seat 62. A disc valve 64 is movable to and from the seat 62 to respectively disconnect and connect passages 60 and 61. The valve 64 is normally urged to a seated position by a spring 65 which is backed up by a cover plate 66 rigidly associated with the valve body 48.

It will be noted that the passage 61 has a branch 68 which normally leads to the atmosphere but is closed off in Fig. 2 by a valve element 69. As shown in Fig. 2 the element 53 has been moved to the left to unseat the valve 64 and connect the sub-atmospheric pressure passages 60 and 61 and simultaneously close the atmospheric vent 68 of the passage 61 by closure of the valve 69. While the parts are held in this position by the operator through the medium of the knob 55, the partial vacuum applied to the dry chamber 27 of the pump 21 raises the diaphragm 25 and expands the wet chamber 26, drawing thereinto a suitable charge of cleaning or de-icing liquid.

When the chamber 26 is sufficiently expanded the operator merely releases the knob 55 and the element 53 is moved to the right as seen in Fig. 2 by a compression coil spring 70 which acts between a portion of the valve housing 48 and a collar 71 rigidly associated with the valve 69. Movement in this direction is limited by engagement of the right-hand end of the valve 69 with the bearing portion of the housing 48.

Such movement results in closure of the valve 64 by the spring 65 and a cessation of the application of partial-vacuum influence to the pump 21. Simultaneously, the dry chamber 27 of the pump 21 is vented to the atmosphere as a result of the opening of the valve 69 and the spring 29 moves the diaphragm downwardly to expel the charge of cleaning or de-icing liquid through the conduits 34 and the jet 22.

The collar 71 has rigidly associated therewith an arm 75 which is adapted to control the condition of operation of the fluid pressure wiper operating motor 14 by pivotal movement about the axis of the element 53. It will be understood that the collar 71 and the valve 69 are fixed for rotation with the element 53 and to this end valve 69 may be pressed on the stem portion 57 of the element 53 over suitable serrations 74.

Referring to Fig. 3, the arm 75 is connected to the control valve 16 of the motor 14 by a link 78 which is pivotally connected to the outer end of the arm 75 and to the control valve 16 at its opposite ends. In Fig. 3 the control valve 16 is shown in operative position, that is, in its extreme of movement to the right as seen in Fig. 3. It will be noted that clockwise movement of the knob 55 and the element 53 will result in movement of the arm 75 and the link 78 to move the control valve 16 to the left and to a position for arresting further movement of the motor 14 and the wiper 12.

In the modification of Fig. 4 the valve arrangement for controlling operation of the pump 21 is slightly changed. In Fig. 4 a housing 48', a valve operating and control element 53' and a passage 61' correspond to like numbered elements of the embodiment of Fig. 2. In Fig. 4, however, the passage 60' enters the valve chamber co-axially with the element 53' and the valve 64'. In this arrangement it is essential that some means be provided for permitting fluid passage around the outer edge of the valve 64' when the latter is unseated, and to this end the periphery of the valve 64' may be notched in a conventional manner. As in the embodiment of Fig. 2, the passage 61' has an atmospheric branch 68' whose communication with the atmosphere is controlled by a valve 69'. Excepting for the details here noted, the modification of Fig. 4 is the same in construction and operation as that of Figs. 1, 2 and 3.

From the foregoing, and referring to either of the described embodiments, it will be noted that the operator holds the knob 55 in during the time that the wet chamber 26 is filling. If during this period it comes to his attention that the wiper 12 is inactive, he may rotate the knob without interfering with the continued filling of the wet chamber 26, since the cooperation of the wiper in spreading the cleaning or de-icing liquid is desirable to the extent of being practically necessary. Likewise, if the wet chamber has already been filled when he notices that the wiper is inactive, he may delay expulsion of the spraying liquid, by holding the knob in, until he has, by other manipulation of the same knob, initiated actuation of the wiper. This possible mode of operation eliminates the waste of liquid which would occur if, during or after charging of the liquid expelling pump 21, the operator found it necessary to initiate operation of the wiper during or after the expulsion of the liquid upon the windshield.

While specific embodiments of the teachings of our invention are shown in the drawing and described in detail herein, our invention is not to be considered as limited thereto or otherwise than as defined in the appended claims.

What we claim is:

1. In a windshield cleaning system, wiper means and liquid applying means for cooperation therewith, a fluid pressure motor associated with each of said means for actuating the same, common control means for said motors comprising a bearing and a manipulating element supported thereby for relative axial and rotative movement, an arm fixed for rotation with said element and connecting with a control valve on said wiper means motor whereby upon rotative movement thereof said wiper means motor is rendered respectively operative and inoperative, and valve means acted upon by said element upon axial movement thereof for rendering said applying means motor respectively operative and inoperative.

2. In a windshield cleaning system, wiper means and liquid spraying means for cooperation therewith, a fluid pressure motor associated with each of said means for actuating the same, common control means for said motors comprising a bearing and a manipulating element supported thereby for relative axial and rotative movement, means acted upon by said element upon rotative movement thereof for rendering one of said motors respectively operative and inoperative, and means acted upon by said element upon axial movement thereof for rendering the other of said motors respectively operative and inoperative, said last mentioned means comprising a valved passage and a valved atmospheric vent, said manipulating element being adapted in one axial position to open said valved passage and close the atmospheric vent, said valved passage being closed and said atmospheric passage being opened upon movement of said manipulating element to another axial position.

3. In a windshield cleaning system, wiper means and liquid spraying means for cooperation therewith, a fluid pressure motor associated with each of said means for actuating the same, common control means for said motors comprising a bearing and a manipulating element supported thereby for relative axial and rotative movement, means acted upon by said element upon rotative movement thereof for rendering one of said motors respectively operative and inoperative, and means acted upon by said element upon axial movement thereof for rendering the other of said motors respectively operative and inoperative, said last mentioned means comprising a fluid passage, a valve therein and resilient means normally urging said valve to a position for closing said passage, an atmospheric vent in said fluid passage between said valve and said spraying means motor, a valve for closing said vent and resilient means normally urging said second valve to open position, said manipulating element being manually movable axially to open said first valve and close said second valve against the resistance of their respective resilient means.

4. In a windshield cleaning system, wiper means and liquid spraying means for cooperation therewith, an actuating motor associated with said wiper means, a source of operating fluid pressure and a conduit extending therefrom to said spraying means for operating the latter, common control means for said wiper means and liquid spraying means comprising a supporting bearing and a fluid passage comprising a portion of said fluid pressure conduit and having a resiliently closed valve therein, a manipulating element journalled in said bearing and movable axially therein to engage and unseat said valve, an arm fixed to said element for rotation therewith and having connection with said wiper means motor to render the same selectively operative and inoperative by rotation of said manipulating element.

5. In a windshield cleaning system, wiper means and liquid applying means for cooperation therewith, a fluid pressure motor associated with each of said means for actuating the same, common control means for said motors comprising a bearing and a manipulating element supported thereby for relative axial and rotative movement, means fixed for rotation with said element and connecting with a control valve on said wiper means motor whereby upon rotative movement thereof said wiper means motor is rendered respectively operative and inoperative, and valve means acted upon by said element upon axial movement thereof for rendering said applying means motor respectively operative and inoperative.

ERWIN C. HORTON.
DONALD N. MUSSEN.
ANTON RAPPL.